United States Patent Office 3,619,986
Patented Nov. 16, 1971

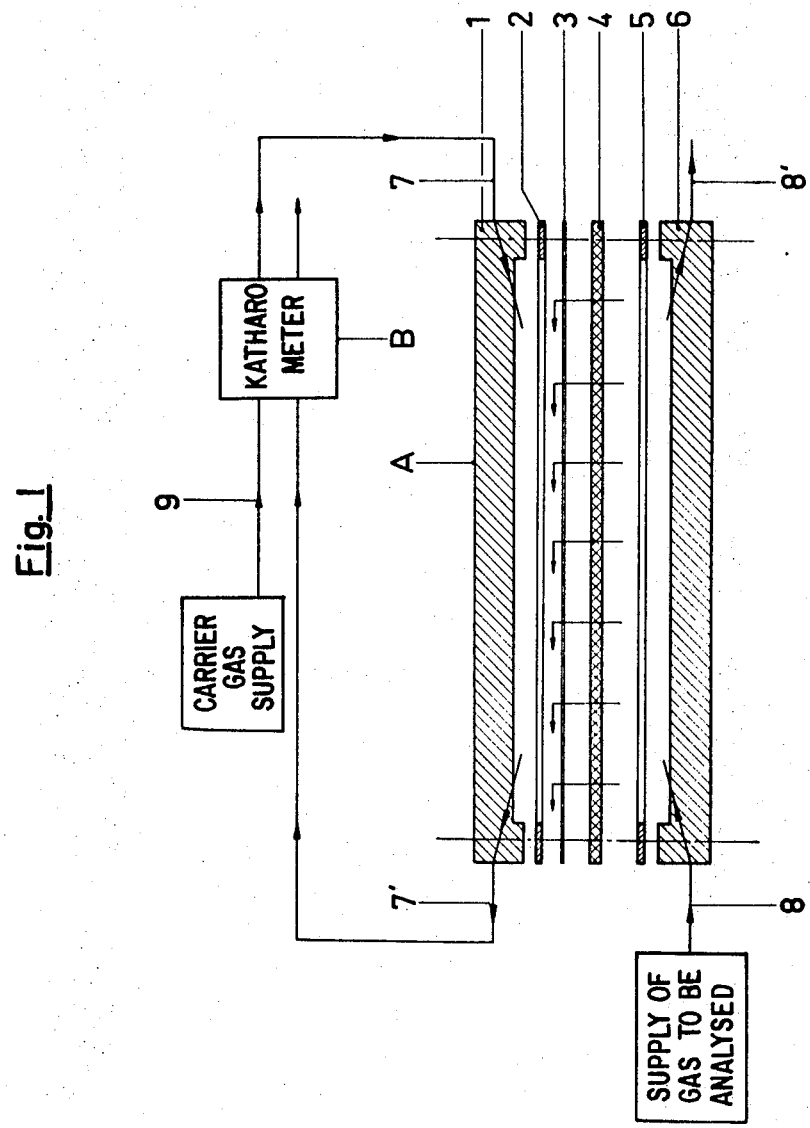

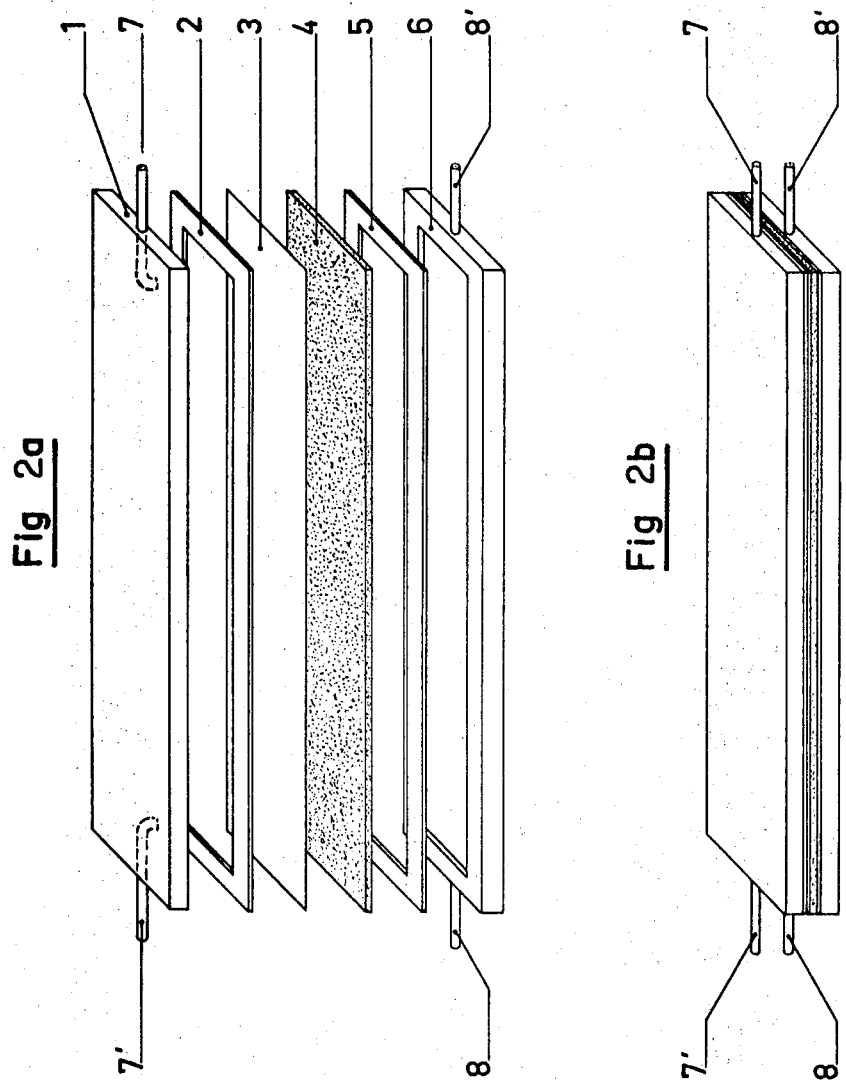

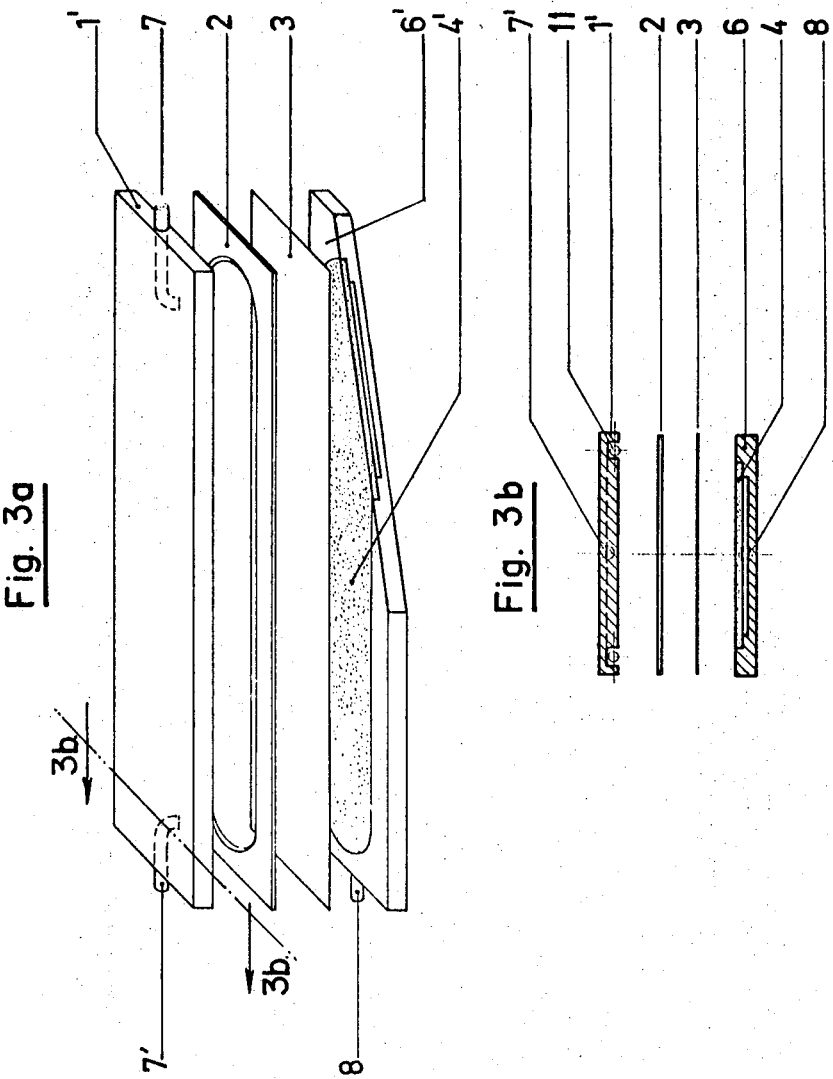

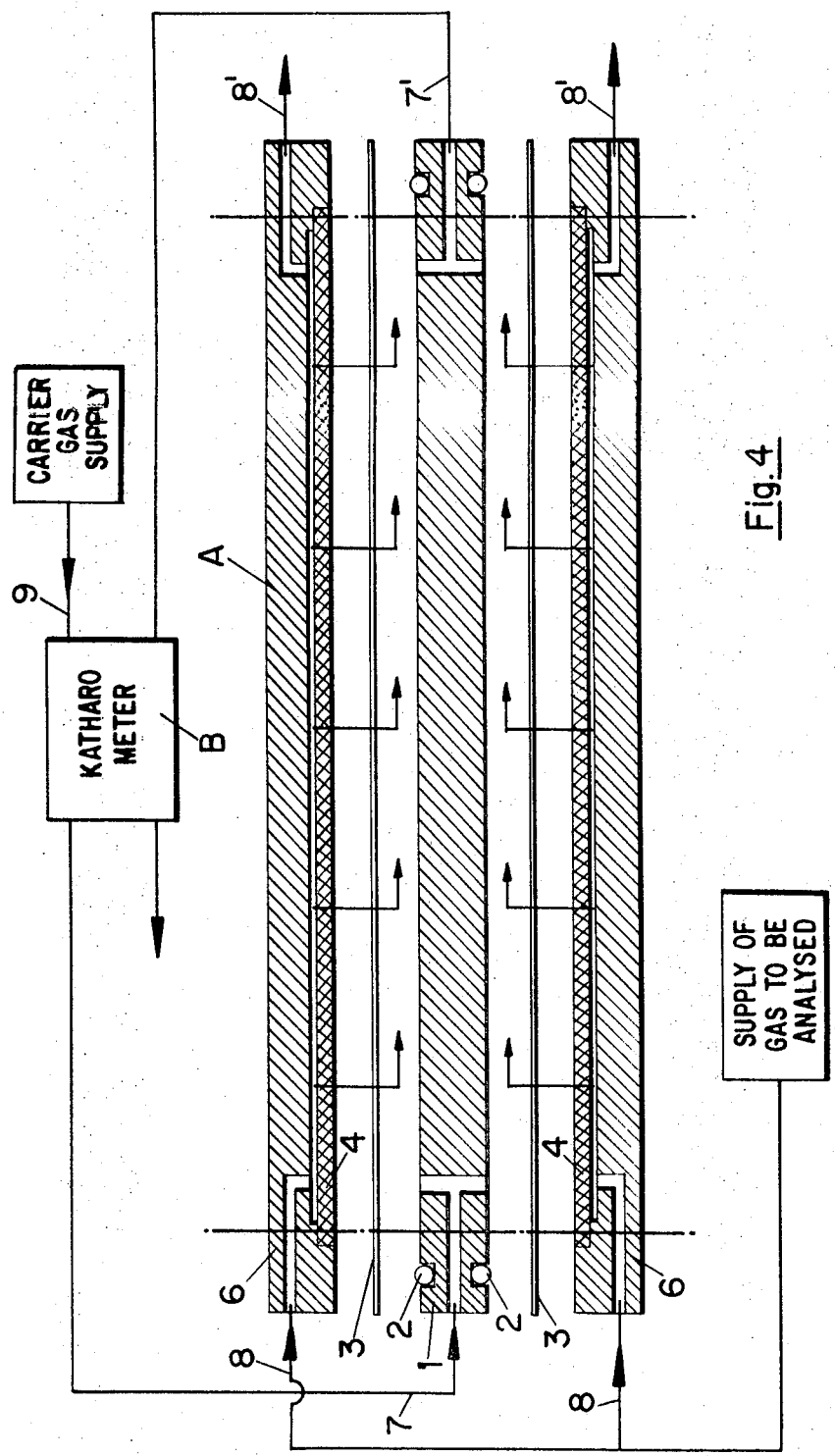

3,619,986
QUANTITATIVE GAS ANALYSIS APPARATUS
Rene Mormont, Brussels, and Jean Duez, Ganshoren, Belgium, assignors to Solvay & Cie, Brussels, Belgium
Filed Mar. 7, 1969, Ser. No. 805,250
Claims priority, application Belgium, Mar. 7, 1968, 55,458
Int. Cl. B01d 53/22
U.S. Cl. 55—158　　　6 Claims

ABSTRACT OF THE DISCLOSURE

Apparatus for performing a continuous quantitative analysis of the hydrogen present in a gaseous mixture, the apparatus essentially including a diffusion cell presenting a first gas flow space for the passage of the gaseous mixture whose hydrogen content is to be analyzed, a second gas flow space for the passage of a carrier gas, and a semipermeable membrane which is essentially permeable only to hydrogen and which is disposed between the two spaces so that the hydrogen diffusing through the membrane will be entrained by the carrier gas, the apparatus further including a katharometer having one inlet connected to receive the carrier gas before it passes to the diffusion cell and a second inlet for receiving the hydrogen-laden carrier gas leaving the diffusion cell, the katharometer providing an indication of the difference between the thermal conductivities of the two gases which it receives, which difference is representative of the initial hydrogen content of the gaseous mixture being analyzed.

BACKGROUND OF THE INVENTION

The present invention relates to quantitative analysis apparatus, and particularly to apparatus for performing a quantitative analysis of the hydrogen present in a gaseous mixture.

The invention is based esentially on the principle of selective diffusion of hydrogen through a suitable barrier to permit a continuous determination of the concentration of hydrogen present in a gaseous mixture, and particularly in a corrosive gaseous mixture containing chlorine and/or oxygen.

There already exist a certain number of devices which utilize the selective diffusion properties of metals from Group VIII of the Periodic Table, particularly palladium and its alloys, for separating hydrogen from a gaseous mixture. For example, in U.S. Pat. No. 2,456,163, issued to Charles C. Watson in December 1948, there is disclosed an apparatus for determining the concentration of hydrogen in a gas as a function of the relationship between two pressures, one pressure being that of the hydrogen collected in an enclosure surrounding a palladium sleeve traversed by the gas being analyzed, the other being the pressure of the gas at its inlet to the sleeve.

According to a similar device described by V. P. Ryabov (Zavodskaya Laboratoriya, 1963, vol. 29, No. 7, pages 824–825), the hydrogen in a gas to be analyzed diffuses toward the interior of a palladium tube in which a vacuum has been preliminarily established, the pressure existing at the interior of the tube when diffusion equilibrium has been attained indicating the hydrogen concentration of the gas.

In practice, such quantitative hydrogen analysis devices present several serious inconveniences. Firstly, they require, in effect, that the hydrogen diffuse completely and as rapidly as possible in order for the measurement of the pressure of the diffused hydrogen to constitute a precise and rapidly obtained indication of the quantity of hydrogen initially present in the gas. To achieve this, it is necessary to raise the pressure of the gas to be analyzed or at least to raise it to temperatures of around 400° C. in order to increase the diffusion velocity. In addition to the resulting complications, the establishment of equilibrium takes a relatively long time, of the order of 10 to 15 minutes (as explained by J. R. Young in Review of Scientific Instruments, October 1960, pages 1112–1114). Secondly, at such temperatures the surface of the diffusion element is likely to be contaminated by the volatile chloride formed by reactions between the iron present in the exterior envelope of the apparatus and the chlorine, when the mixture to be analyzed contains chlorine, and the chlorine can also react with the hydrogen. Thirdly, the tubular palladium diffusion barriers utilized in these devices render the devices quite expensive.

In order to diminish the cost of such devices, it has also already been proposed to reduce the required quantity of precious metal by utilizing such metal in the form of thin membranes disposed on a porous support, the support being provided to prevent any deformation which the membrane might tend to undergo when a pressure differential exists between its two faces. Such devices employing a diffusion membrane of palladium or a palladium alloy are utilized industrially for separating hydrogen, as is disclosed by A. J. Derosest in his U.S. Pat. No. 2,958,391, issued on Nov. 1, 1960, and in Ind. Eng. Chem., 1960, vol. 52, No. 6, pages 525–528. However, such systems are only utilized for processes requiring the separation of hydrogen, and their application to the quantitative analysis of the hydrogen present in a gas is hindered by the shortcomings noted above.

SUMMARY OF THE INVENTION

It is a primary object of the present invention to eliminate such drawbacks and difficulties.

Another object of the invention is to substantially facilitate the quantitative analysis of the hydrogen present in a gaseous mixture.

Still another object of the invention is to substantially reduce the cost of apparatus for performing such quantitative analysis.

Another object of the invention is to increase the accuracy of such analysis.

Still another object of the invention is to substantially reduce the time required for performing such analysis.

Yet a further object of the invention is to permit an accurate analysis of the hydrogen present in a gaseous mixture to be performed at ambient temperature and pressure.

A still further object of the invention is to permit the performance of a quantitative analysis of the hydrogen present in a gaseous mixture forming a part of an industrial fabrication process, without altering the conditions under which such mixture exists within the process.

A further, specific, object of the invention is to provide selective diffusion membranes which are particularly resistant to corrosion by the ingredients of the gaseous mixture and which are made of a material that is relatively inexpensive compared with the materials employed in prior art membranes.

A further specific object of the invention is to provide quantitative hydrogen analysis apparatus which is particularly well suited for use in connection with the industrial electrolytic liquefaction of chlorine.

These and other objects according to the invention are achieved by the provision of a novel apparatus for the continuous quantitative analysis of the hydrogen present in a gaseous mixture, which apparatus essentially includes a diffusion cell and a katharometric cell. The diffusion cell according to the invention is composed of means defining a first space for the passage of the gaseous mixture at substantially constant temperature, pressure and flow rate, means defining a second space for the passage of an initially hydrogen-free carrier gas at substantially constant temperature, pressure and flow rate, and means defining a gas inlet conduit and a gas outlet conduit in communication with each space. The diffusion cell further includes a semi-permeable membrane interposed between, and separating, the two spaces, the membrane being essentially permeable only to the hydrogen contained in the gaseous mixture and being wholly constituted by synthetic polymer material comprising at least one copolymer containing at least two comonomers selected from among vinyl chloride, vinylidene chloride, acrylonitrile and methyl acrylate, whereby hydrogen diffusing through the membrane is entrained by the carrier gas passing through the second space. The diffusion cell is completed by a porous support supporting the membrane. The katharometric cell is disposed outside of the diffusion cell and connected to simultaneously receive, via separate inlets, both hydrogen-free carrier gas and the hydrogen-laden carrier gas passing through the outlet conduit of the second space. The katharometric cell produces an indication of the difference between the thermal conductivities of the two gases which it receives, which indication constitutes a measure of the initial hydrogen concentration in the gaseous mixture.

BRIEF DESCRIPTION OF THE DRAWINGS

FIG. 1 is a view, partially in exploded, cross-sectional form and partially in block form, of a preferred embodiment of the invention.

FIG. 2a is an exploded perspective view of one element of the embodiment of FIG. 1.

FIG. 2b is an assembled perspective view of the element shown in FIG. 2a.

FIG. 3a is a view similar to that of FIG. 2a, partially cut-away, of another form of construction of the element shown in FIG. 2a.

FIG. 3b is a cross-sectional end view of the element of FIG. 3a, taken along the plane 3b—3b of FIG. 3a.

FIG. 4 is an assembled perspective view of an apparatus with two cells of diffusion, disposed on both sides of a single gas distribution device for the gas whose hydrogen concentration is to be analysed.

DESCRIPTION OF THE PREFERRED EMBODIMENTS

Referring now to FIG. 1, there is shown a preferred embodiment of a dosage device according to the invention whih includes a diffusion cell A and a katharometer cell B. The diffusion cell A is composed of a cover plate 1 and a base plate 6, the inner face of at least the base plate 6 being recessed to define a portion of a gas flow space. The recess in plate 6, for example, is shown most clearly in FIG. 2a. Cover plate 1 is provided with two conduits 7 and 7' which communicate with a region below that plate, while base plate 6 is similarly provided with two conduits 8 and 8' in communication with the space defined by the recess in that plate.

Adjacent the edge of plate 1 is disposed a thin gasket 2, while a somewhat thicker gasket 5 is disposed adjacent the rim of base plate 6. Between the two gaskets are disposed a thin diffusion membrane 3 and a porous support arranged to support the membrane 3 so as to keep the membrane flat.

The cell in its completely assembled state is shown in FIG. 2b. The components of the cell may be permanently joined together, as by cementing for example, or may be tightly clamped together, this mode of attachment being preferable in those cases where it might be desired to replace the membrane 3 or the support 4 from time to time.

In a typical embodiment of the cell A the plates 1 and 6 may each be constituted by a stainless steel body whose dimensions are of the order of 50 x 8 x 1.5 cm. The gasket 2 preferably has a maximum thickness of the order of 0.2 mm., and preferably of the order of 0.1 mm., and effectively defines the height of the gas flow space, or zone, below plate 1. This gasket could be quite simply made of a piece of laboratory filter paper. The diffusion membrane 3, whose composition will be described in greater detail below, preferably has a thickness of between 0.01 and 0.1 mm. The porous support, whose thickness is not of critical importance, could be made, for example, of porcelain, or of stainless steel, such as the material sold under the trademark Poral. The gasket 5 can be made of rubber or polytetrafluoroethylene and preferably has the thickness of the order of 1 mm.

In the use of the device illustrated in FIGS. 1, 2a and 2b, the gas to be analyzed is introduced via conduit 8 and is maintained at a constant temperature and pressure within the gas flow zone defined by the recess in base plate 6 and gasket 5. It is caused to flow through this zone at a constant rate and exits via the conduit 8'. As the gas traverses this zone, the hydrogen therein flows through the support 4 and diffuses through the membrane 3 so as to enter into the collecting zone below plate 1. At the same time, a carrier gas is introduced into this latter zone via conduit 7 and is likewise maintained at a constant temperature and pressure within the zone. The carrier gas is caused to traverse the zone at a constant flow rate, mixes with the hydrogen which has diffused through membrane 3 and the resulting mixture leaves via conduit 7'.

In a typical operation of the device, the carrier gas is constituted by nitrogen which is caused to traverse the zone between conduits 7 and 7' at a rate of 50 cc./minute at atmosphere pressure and at a temperature of 30° C. At the same time, the gas whose hydrogen concentration is to be analyzed can be caused to flow through the region between conduits 8 and 8' at a rate which varies between 20 and 200 cc./minute.

Before flowing through conduit 7, the carrier gas is caused to traverse katharometer cell B while its temperature, pressure and flow rate are maintained at the same values as in cell A. This gas is delivered to katharometer B via an inlet conduit 9. The hydrogen-carrier gas mixture exiting via conduit 8' is delivered to another inlet of cell B. Cell B functions in a well-known manner to provide an indication of the difference betwen the htermal conductivities of the two gases delivered thereto and this indication constitutes a representation of the initial hydrogen concentration in the gas to be analyzed.

Within diffusion cell A, the carrier gas is caused to flow in counter-current to the gas to be analyzed so as to aid the entrainment of the diffused hydrogen in the carrier gas.

The carrier gas entering in conduit 7 is free from hydrogen so that it contains only diffused hydrogen when it leaves the cel through conduit 7'; the amount of hydrogen diffused through the membrane is only function of the difference between the partial pressures of hydrogen on both sides of the membrane.

Another embodiment of the diffusion cell according to the invention is shown in FIGS. 3a and 3b. In this embodiment, the lower gasket 5 is eliminated by setting the porous support 4' into a mating recess formed in the upper surface of base plate 6'. Below this recess is formed another recess having a smaller cross-sectional area and constituting the zone into which is introduced the gas to be analyzed. This latter zone preferably has a height of the order of 0.5 mm. and communicates with the conduit 8 and 8'. The diffusion membrane 3 is then disposed on the common surface defined by the edge portion of the upper surface of plate 6' and the upper surface of support 4'.

As is shown in FIG. 3b, a groove is provided adjacent the periphery of cover plate 1' and within this groove is disposed a toroidal gasket 11 which proviods a hermetic seal between plate 1' and gasket 2.

The conduits 7 and 7' are arranged, in both illustrated embodiments, to communicate with the zone enclosed by gasket 2.

It is also possible, according to the invention, to form a diffusion cell by combining a plurality of basic cell units. For example, a cell could be readily constructed to have two zones for the circulation of the gas to be analyzed and an interposed carrier gas circulation zone which is separated from each of the first-mentioned zones by a respective one of two diffusion membranes.

As a general rule, the apparatus according to the invention lends itself quite readily to the quantitative analysis of the hydrogen present in gaseous mixtures containing one or several gasses such as oxygen, nitrogen, chlorine, carbon oxides, or hydrocarbons such as methane, acetylene, ethylene and propylene in particular. In each case, it has been found that the apparatus has a response time not exceeding 30 seconds and yields a measuring precision in the vicinity of 100%.

The determination of the quantity of hydrogen which has diffused thorugh the membrane 3 could, in principle, be effected by other types of hydrogen detectors, such as a platinum sponge detector for example, when the gaseous mixture whose hydrogen content is being measured does not contain combustible gasses other than hydrogen. However, applicant has discovered that it is preferable to utiilze a katharometric detector in embodiments of the invention because it has been noted that when this type of detector is utilized in combination with diffusion membranes according to the invention, the resultng indication is practically independent of any other constituents of the gas being analyzed and is truly indicative of the quantity of hydrogen to be measured.

Although the properties of diffusion membranes made of plastic materials are well known, applicant has discovered that many specific membranes of this type would present a katharometric cell from producing an accurate representation of the quantity of hydrogen being measured because such membranes permit the diffusion of substantial quantities of gasses other than hydrogen, particularly oxygen, nitorgen, chlorine and carbonic gas.

Table I below indicates the qualities of various membranes tested. In this table, the plus sign (+) indicates that the final katharometric measurement is substantially influenced by the corresponding gas, while the minus sign (—) indicates, on the contrary, that the final katharometric measurement is not influenced by the presence of the corresponding constituent in the gas whose hydrogen content is to be measured. From the results of the tests summairzed in Table I, it has been possible to isolate a certain group of membranes whose diffusion property is highly selective with respect to hydrogen when employed in a diffusion cell according to the present invention.

12—copolymer of 90–91% vinylidene chloride and 9–10% acrylonitrile.

The thicknesses of these membranes are preferentially between 0.01 and 0.1 mm.; they can be obtained according to the processes described in our Belgian patents 633,846 and 647,972. Membrane 13 is a film sold under the name "Clysar 125–PC 10" by Du Pont de Nemours.

In addition to the responses of the membranes to the various constituents listed in Table I, it has been noted that when membranes of the type identified as Samples Nos. 7, 8, 11, 12 and13 where employed in a diffusion cell according to the invention, the presence in the gas to be analyzed of hydrocarbons such as acetylene, ethylene and propylene, in particular, did not have any adverse influence on the measurement of the quantity of hydrogen present in this gas.

The selectivity of membranes made of synthetic polymers composed of copolymers containing at least two comonomers chosen from among vinyl chloride, vinylidene chloride, nitrile acrylic and methyl acrylate is obvious.

Within this class, preference is given to membranes composed of a polypropylene base having its two faces coated with a copolymer of 60% vinylidene chloride and 40% methyl acrylate because of the higher hydrogen diffusion rate presented by such membranes. This is illustrated in Table II below setting forth the hydrogen diffusion rates for certain of the membranes of Table I under normal temperature conditions and normal hydrogen pressure difference conditions.

TABLE II

| Membrane Sample Number: | Diffusion rate in gr.-moles/$(cm.^2)$(min.) |
|---|---|
| 8 | $1.10^{-9}$ |
| 11 | $1.10^{-9}$ |
| 12 | $3.10^{-9}$ |
| 13 | $5.10^{-9}$ |

Although the rates of diffusion across these membranes of polymer material are clearly lower than those of standard metallic membranes composed of palladium raised to a high temperature, the membranes which applicant selects for use in diffusion cells according to the invention have proven to be fully satisfactory since they permit the hydrogen content of a gas to be quantitatively analyzed within a maximum time of 30 seconds and with an accuracy of close to 100%. Moreover, these membranes present the advantages of being capable of being placed into operation easily and are quite inexpensive compared with standard membranes made of precious metals.

TABLE I

| Sample No. | Sample composition | Sample thickness, $\mu$ | $H_2$ | $O_2$ | $N_2$ | $Cl_2$ | $CO_2$ | $CO$ | $CH_4$ |
|---|---|---|---|---|---|---|---|---|---|
| 1 | Metallized paper | | − | | − | | | | |
| 2 | Polytetrafluoroethylene | 100 | + | + | − | | + | | |
| 3 | Polytetrafluoroethylene | 50 | + | + | − | | + | | |
| 4 | Low density polyethylene | | + | + | + | | + | | |
| 5 | High density polyethylene | | + | + | + | | + | | |
| 6 | Polyvinylchloride | 23 | + | + | − | − | + | | |
| 7 | Copolymer of vinyl chloride, vinylidene chloride, glycidyl methacrylate and alfol acrylate. | 20 | + | − | − | − | − | − | − |
| 8 | Copolymer of vinyl chloride vinylidene chloride and glycidyl methacrylate | 20 | + | − | − | − | − | − | − |
| 9 | Paper coated with a copolymer of vinyl chloride and vinylidene chloride | 35 | + | − | + | | + | | |
| 10 | Cellulose coated on both faces with a copolymer of vinyl chloride, vinylidene chloride and nitrile acrylic. | 30 | − | | | | | | |
| 11 | PVC having a thickness of $12\mu$ coated on one face with a copolymer of vinyl chloride and vinylidene chloride to a thickness of $8\mu$. | 20 | + | − | − | − | − | − | − |
| 12 | Polypropylene having a thickness of $20\mu$ coated on both faces with a vinylidene chloride and acrylonitrile copolymer. | 24 | + | − | − | − | − | − | − |
| 13 | Polypropylene having a thickness of $20-30\mu$ coated on both faces with a copolymer of 60% vinylidene chloride and 40% methyl acrylate to a thickness of $2\mu$ on each face. | 24-34 | + | − | − | − | − | − | − |

The preferred membranes have the following compositions (percent by weight)

7—11–12% vinyl chloride, 86–87% vinylidene chloride, 1% glycidyl methacrylate and 1% alfol acrylate
8—80% vinylidene chloride, 15–20% vinyl chloride, 2–2.2% glycidyl acrylate
11—22% vinyl chloride and 78% vinylidene chloride Above all, the membranes employed according to the invention have proven to be highly resistant to chlorine and do not support any chemical reaction.

As has been noted above in the description of the illustrated embodiments, the diffusion membranes employed in cells according to the invention are preferably disposed on a support plate made of a porous material and serving to prevent the membrane from undergoing any physical deformation under the influence, for example, of possible pressure differences. Support plates for use in cells according to the invention could be made, for example, of porcelain, fritted steel, or the material sold under the trademark of Alundum.

Another advantage of the apparatus according to the invention resides in its ability to receive a continuous flow of the gaseous mixture whose hydrogen content is to be analyzed as well as of the carrier gas for the diffused hydrogen, the two gasses flowing through their respective zones of the diffusion cell under atmospheric pressure and at ambient temperature. Since the normal functioning of the hydrogen diffusion operation does not depend on the partial pressure of the hydrogen at either side of the membrane, the temperature, pressure and flow rates of the two gasses are of little importance in and of themselves so long as they remain constant during the entire measuring operation.

Because each of the two gas currents flow through the diffusion cell at constant temperature, pressure and flow rate, the quantity of hydrogen diffusing across the membrane will be a constant, although possibly a small fraction of the quantity of hydrogen in the gas to be analyzed. As a result, a simple calibration of the measuring apparatus will permit the indications provided by the katharometric cell to be converted directly into an indication of the concentration of hydrogen in the gas being analyzed. The carrier gas is normally constituted by nitrogen or air. However, other gases such as $CO_2$ and methane, whose thermal conductivities differ substantially from that of hydrogen, also prove to be quite suitable. The carrier gas preferably flows through the apparatus under atmospheric pressure and, as mentioned before, flows through the diffusion cell in the opposite direction from the gas to be analyzed so as to aid the entrainment of the diffused hydrogen in the carrier gas.

In order to increase the accuracy of the katharometric measurements, the diffused hydrogen should not be overly diluated by the carrier gas. It is for this purpose that the volume of the carrier gas circulation zone within the diffusion cell is preferably reduced to a minimum, for example by defining the height of the zone by the gasket 2 having a maximum thickness of 0.2 mm., the gasket being fastened between the diffusion membrane 3 and the cover plate 1 of the diffusion cell.

The two gas zones, or spaces, of the diffusion cell are preferably in the form of an elongated parallelepiped. It has been found that this form of construction assures a rapid and complete renewal of the gas to be analyzed in the zone provided for this gas and a correspondingly rapid and complete entrainment of the diffused hydrogen by the carrier gas in the zone provided for this gas. These advantages results directly from the elongated form of the diffusion cell and serve to substantially reduce the response time of the measuring apparatus.

According to FIG. 4, the apparatus may also be constituted with two membranes 3; for this purpose, the apparatus has a single carrier gas distribution device 1, with conduit 7 adapted to deliver this gas towards the spaces delimited by 1, the toroidal gaskets 2 and the membranes 3, so that the gas carries away the hydrogen diffused to the katharometer B via conduit 7'. The gas to be analysed is divided in two portions which enter, through 8, in the introduction zones delimited by a recess in base plates 6 where a porous support 4 is inserted and sealed.

It is understood that the above description of the present application is susceptible to various modifications, changes and adaptations.

We claim:
1. Apparatus for the continuous quantitative analysis of the hydrogen present in a gaseous mixture, comprising, in combination:
   (a) a diffusion cell composed of: means defining a first space for the passage of the gaseous mixture at substantially constant temperature, pressure and flow rate; means defining a second space for the passage of an initially hydrogen-free carrier gas at substantially constant temperature, pressure and flow rate; means defining a gas inlet conduit and a gas outlet conduit in communication with each of said spaces; a semi-permeable membrane interposed between, and separating, said two spaces, said membrane being essentially permeable only to the hydrogen contained in the gaseous mixture and wholly constituted by synthetic polymer material comprising at least one copolymer containing at least two comonomers selected from the group consisting of vinyl chloride, vinylidene chloride, acrylonitrile and methyl acrylate, whereby hydrogen diffusing through said membrane is entrained by the carrier gas passing through said second space; and a porous support supporting said membrane; and
   (b) a katharometric cell disposed outside of said diffusion cell and connected to simultaneously receive, via separate inlets, both hydrogen-free carrier gas and the hydrogen-laden carrier gas passing through said outlet conduit of said second space, said katharometric cell producing an indication of the difference between the thermal conductivities of the two gases which it receives, which indication constitutes a measure of the initial hydrogen concentration in the gaseous mixture.

2. An arrangement as defined in claim 1 wherein said semi-permeable membrane is constituted by a film of polypropylene having a thickness of 10 to 30 microns, and, on each face of said film, a $2\mu$ thick coating of a copolymer composed of 60% vinylidene chloride and 40% methyl acrylate.

3. An arrangement as defined in claim 1, further comprising means for delivering carrier gas to one inlet of said katharometric cell, and wherein the carrier gas is selected from the group consisting of nitrogen, air, methane and carbonic anhydride.

4. An arrangement as defined in claim 1 wherein said means defining a first space comprise a metal base plate having one face provided with a first recess defining said first space and having the form of a parallelepiped and a second recess which is shallower, and of greater extent, than said first recess, and wherein said membrane is set in said second recess and permanently attached to said base plate.

5. An arrangement as defined in claim 1 wherein said means defining a second space include a metal cover plate and a gasket disposed between the peripheral portion of said cover plate and said membrane and defining the lateral boundaries of said second space.

6. An arrangement as defined in claim 1 wherein there are two second spaces and one first space disposed between said second spaces, and there are two said membranes, each disposed between said first space and a respective one of said second spaces.

References Cited

UNITED STATES PATENTS

| | | | |
|---|---|---|---|
| 2,970,106 | 1/1961 | Binning et al | 55—16 X |
| 3,438,241 | 4/1969 | McKinley | 73—23 |

REUBEN FRIEDMAN, Primary Examiner

C. N. HART, Assistant Examiner